US008433697B2

(12) United States Patent
Osterman et al.

(10) Patent No.: US 8,433,697 B2
(45) Date of Patent: Apr. 30, 2013

(54) FLEXIBLE METADATA COMPOSITION

(75) Inventors: Lawrence W. Osterman, Woodinville, WA (US); Harold L. Pierson, Redmond, WA (US); Elliot H. Omiya, Kirkland, WA (US); Martyn S. Lovell, Seattle, WA (US); Mahesh Prakriya, Redmond, WA (US); Stephen C. Rowe, Bellevue, WA (US); Tassaduq H. Basu, Redmond, WA (US); Robert A. Wlodarczyk, Issaquah, WA (US); Wei Zeng, Sammamish, WA (US); Neeraj N. Wadhwa, Kirkland, WA (US); Shakeel I. Solkar, Sammamish, WA (US); Michael Aksionkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 54 days.

(21) Appl. No.: 13/229,697

(22) Filed: Sep. 10, 2011

(65) Prior Publication Data
US 2013/0066899 A1    Mar. 14, 2013

(51) Int. Cl.
G06F 17/30 (2006.01)
(52) U.S. Cl.
USPC .......................................... 707/706; 707/769
(58) Field of Classification Search .............. 707/706, 707/769
See application file for complete search history.

(56) References Cited

U.S. PATENT DOCUMENTS

| | | | |
|---|---|---|---|
| 6,035,297 A * | 3/2000 | Van Huben et al. | 707/695 |
| 6,330,567 B1 | 12/2001 | Chao | |
| 6,560,613 B1 | 5/2003 | Gylfason et al. | |
| 6,785,688 B2 * | 8/2004 | Abajian et al. | 707/700 |
| 7,216,289 B2 | 5/2007 | Kagle et al. | |
| 7,617,225 B2 | 11/2009 | Arrouye et al. | |
| 7,680,801 B2 | 3/2010 | Blumenau et al. | |
| 7,743,045 B2 * | 6/2010 | Guha | 707/706 |
| 7,797,295 B2 * | 9/2010 | Bell et al. | 707/705 |
| 7,822,765 B2 * | 10/2010 | Back et al. | 707/769 |
| 7,865,498 B2 * | 1/2011 | Rodriguez | 707/711 |
| 7,882,122 B2 * | 2/2011 | Wong | 707/760 |
| 7,941,402 B2 * | 5/2011 | Smits | 707/638 |
| 7,962,465 B2 * | 6/2011 | Kraft et al. | 707/706 |

(Continued)

OTHER PUBLICATIONS

Olfat, et al., "Automatic Spatial Metadata Update: a New Approach", Retrieved at <<http://www.fig.net/pub/fig2010/papers/ts05b%5Cts05b_olfat_rajabifard_et_al_4079.pdf>>, Apr. 11-16, 2010, pp. 1-18.

(Continued)

Primary Examiner — Kim Nguyen
(74) Attorney, Agent, or Firm — Wolfe-SBMC

(57) ABSTRACT

Various embodiments provide an ability to abstract type resolution between multiple type systems. At least one type can be described in one or more programmatically accessible file(s). In some embodiments, an application using a different type system can programmatically access and resolve a type of the at least one type system without knowledge of a location of where a description of the type resides. Alternately or additionally, type descriptions contained in the one or more programmatically accessible file(s) can be analyzed and restructured into one or more new programmatically accessible file(s) based, at least in part, upon the type descriptions.

20 Claims, 7 Drawing Sheets

U.S. PATENT DOCUMENTS

| | | |
|---|---|---|
| 8,005,806 B2 * | 8/2011 | Rupp et al. .................... 707/705 |
| 8,010,559 B2 * | 8/2011 | Verma et al. .................. 707/782 |
| 8,010,779 B2 * | 8/2011 | Sermersheim et al. ....... 713/150 |
| 2007/0169079 A1 | 7/2007 | Keller et al. |
| 2008/0040388 A1 | 2/2008 | Petri et al. |
| 2008/0052329 A1 | 2/2008 | Dodge et al. |
| 2010/0306187 A1 | 12/2010 | Arrouye et al. |

OTHER PUBLICATIONS

"International Search Report", Mailed Date: Sep. 12, 2012, Application No. PCT/US2011/055491, Filed Date: Oct. 8, 2011, pp. 9.

* cited by examiner

FLEXIBLE METADATA COMPOSITION

BACKGROUND

Computing devices often run operating systems as a way to manage hardware and/or software resources of the computing devices. In some cases, an operating system can provide simplified, programmatic access to the resources. For example, the operating system can include Application Programming Interfaces (APIs) to expose various components. An application can successfully call an API through a different programming language and/or type system than that of the API, provided the application knows what types are associated with the API. For example, the API can include one or more input and/or output parameter(s). To call the API, the programmer determines not only the API's parameters, but what data types are associated with parameters.

As discussed above, an API can be described with a different type system than that of a calling programming language. To bridge the differing type systems, a programmer typically writes wrapper code to translate between type systems. One way for the programmer to include API access in a program is to include the API definitions into source code through one or more file(s) and/or namespaces. To successfully incorporate the files and/or namespaces into the source code, the source code can be configured to include a reference to the specific location of the files/namespaces (e.g. hardcoded path, accessing a registry key with the path, etc.). If the location, file name, and/or namespace name changes, the linkage is broken until the code and/or software tools are updated with appropriate changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to abstract type resolution between multiple type systems. At least one type can be described in one or more programmatically accessible file(s). In some embodiments, an application using a different type system can programmatically access and resolve a type of the type system without knowledge of a location of where a description of the type resides. Alternately or additionally, type descriptions contained in the one or more programmatically accessible file(s) can be analyzed and restructured into one or more new programmatically accessible file(s) based, at least in part, upon the type system descriptions.

BRIEF DESCRIPTION OF THE DRAWINGS

The same numbers are used throughout the drawings to reference like features.

DETAILED DESCRIPTION

Overview

Various embodiments provide an ability to abstract type resolution between multiple type systems. An application using one type system can call into a second type system provided the application has knowledge on how to bridge between type systems. For example, characteristics of a type system (e.g. data types, behavior of data types, function call parameters, events, and the like) can be described in one or more programmatically accessible file(s). An application can access the files and resolve the differing type systems. In some embodiments, type resolution can be abstracted such that the application can access the descriptions without prior knowledge of which file to access, and/or where the files reside.

In the discussion that follows, a section entitled "Operating Environment" is provided and describes multiple environments in which one or more embodiments can be employed. Following this, a section entitled "Type Resolution Architecture" describes an architecture that enables programmatic type system resolution. Next, a section entitled "Type Description Storage" describes various methods that can be used to enable flexible storage of type descriptions. Last, a section entitled "Example System" describes an example system that can be utilized to implement one or more embodiments.

Having provided an overview of various embodiments that are to be described below, consider now example operating environments in which one or more embodiments can be implemented.

Operating Environment

Figure 1A:
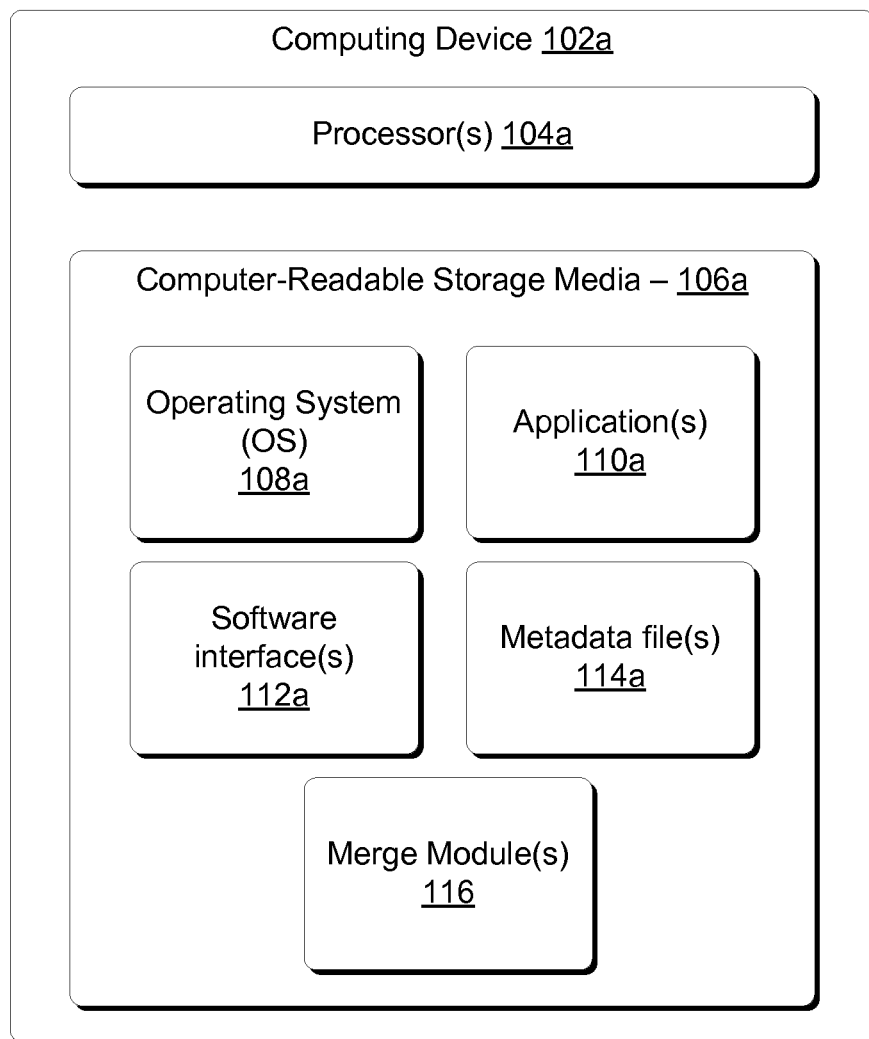
FIG. 1a illustrates an operating environment in which various principles described herein can be employed in accordance with one or more embodiments.
Figure 1B:
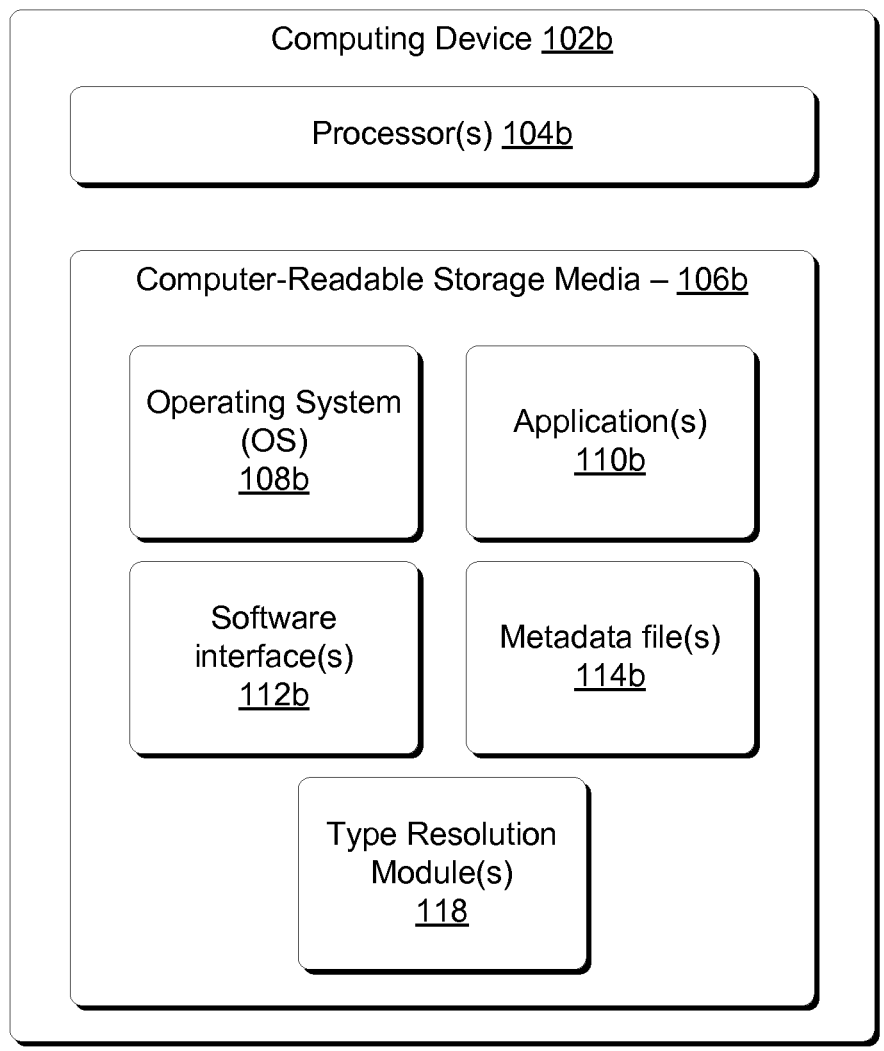
FIG. 1b illustrates an operating environment in which various principles described herein can be employed in accordance with one or more embodiments.

FIGS. 1a and 1b illustrate operating environments in accordance with one or more embodiments, shown generally at 100a and 100b. FIG. 1a illustrates an example operating environment that can be utilized with reference to generation of one or more metadata files, as described below. The environment of FIG. 1a can be considered as a "build time" environment. FIG. 1b illustrates an example operating environment that can be utilized with reference to flexible type system resolution. The environment of FIG. 1b can be considered as a run time environment. In some embodiments, operating environments 100a and 100b have at least some similar components. Accordingly, for the purposes of brevity, FIG. 1a and FIG. 1b will be described together. Similar components associated with FIG. 1a will be identified as components having a naming convention of "1XXa", while components associated with FIG. 1b will be identified as components having a naming convention of "1XXb". Similarly, components specific to an operating environment will simply be identified as "1XX".

Environments 100a and 100b include, respectively, a computing device 102a, 102b having one or more processor(s) 104, 104b, and one or more computer-readable storage media 106a, 106b. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing devices 102a, 102b include operating system(s) (OS) 108a, 108b and application(s) 110a, 110b. Operating systems 108a, 108b represent functionality configured to manage software and/or hardware resource(s) of computing devices 102a, 102b. This can include memory management, file management, services, functions, resource management, peripheral device management, and the like. Application(s) 110a, 110b represent software configured to execute on computing devices 102a, 102b, typically assisted by operating system(s) 108a, 108b. Application(s) 110a, 110b can be implemented in a same and/or different type system than that of operating system(s) 108a, 108b, as further described below.

Computing devices 102a, 102b also include one or more software interface(s) 112a, 112b, which represent programmatic access into functions, services, data, and the like provided by software and/ application(s). Software interface(s) 112a, 112b can enable programmatic access into operating system(s) 108a, 108b and/or application(s) 110a, 110b. For example, application(s) 110a, 110b can access functionality provided by operating system(s) 108a, 108b by calling the software interface(s) 112a, 112b. In some embodiments, application(s) 112a, 112 busing a different type system than that of the software interface can programmatically resolve type differences, as further described below.

In addition, computing devices 102a, 102b also include one or more metadata file(s) 114a, 114b, which represent one or more machine-readable file(s) that include information associated with software interface(s) 112a, 112b, operating system(s) 108a, 108b, and/or application(s) 110a, 110b, such as input parameter types, parameter calling order, relationships between the interfaces, and the like. Alternately or additionally, software interface(s) can be associated with peripheral devices connected to computing devices 102a, 102b, such as a printer, a scanner, a smart phone, and the like. In some embodiments, metadata file(s) 114a, 114b can be configured to describe interface(s) in any suitable way, as further described below.

Computing device 102a also includes merge module(s) 116. Merge module(s) 116 represents functionality that can read one or more metadata file(s), analyze the content of the files, and output one or more new metadata file(s) containing restructured content. In some embodiments, the content can be reorganized based, at least in part, upon type descriptions.

Computing device 102b includes type resolution module(s) 118. Type resolution module(s) 118 represent functionality configured to receive a request to access associated type data, and locate type resolution information. In some embodiments, type resolution module(s) 118 can locate, without user input, the type resolution information, independent of the information changing locations. For example, type resolution module(s) 118 can locate, without user input, interface description information when the information has been moved from a first file to a second file, as further described below.

Computing devices 102a, 102b can be embodied as any suitable computing device such as, by way of example and not limitation, a desktop computer, a portable computer, a notebook computer, a handheld computer such as a personal digital assistant (PDA), cell phone, and the like.

Having described example operating environments, consider now a discussion of a type resolution architecture configured to enable type resolution independent of location file name and/or location.

Type Resolution Architecture

As programming languages advance technically, so do their capabilities. For example, applications written in a first programming language can call into software written in a second programming language Inherently, the programming languages have different type systems. Thus, in order to successfully call software residing in a different type system, the first programming language uses techniques to resolve the varying types. For instance, a programmer can manually write wrapper code to convert between the types. Alternately, type system definitions can be stored in a file and programmatically accessed.

Programmatically accessing a file containing type definitions enables an application to determine capabilities and descriptions at runtime. However, accessing a file implies knowing not only which file to access, but the location of the file. If content of the file changes and/or location of the file changes, applications accessing the file can potentially fail unless properly updated. This can sometimes create an unintentional coupling between the application(s) and file(s).

Various embodiments provide an ability to abstract type resolution between multiple type systems. Information associated with type resolution can be stored in programmatically accessible files. In some embodiments, an application using one type system can dynamically resolve a second type system through access to the files. Alternately or additionally, the application can access the files without knowledge of which file(s) to access, and/or where the file(s) reside.

Figure 2:
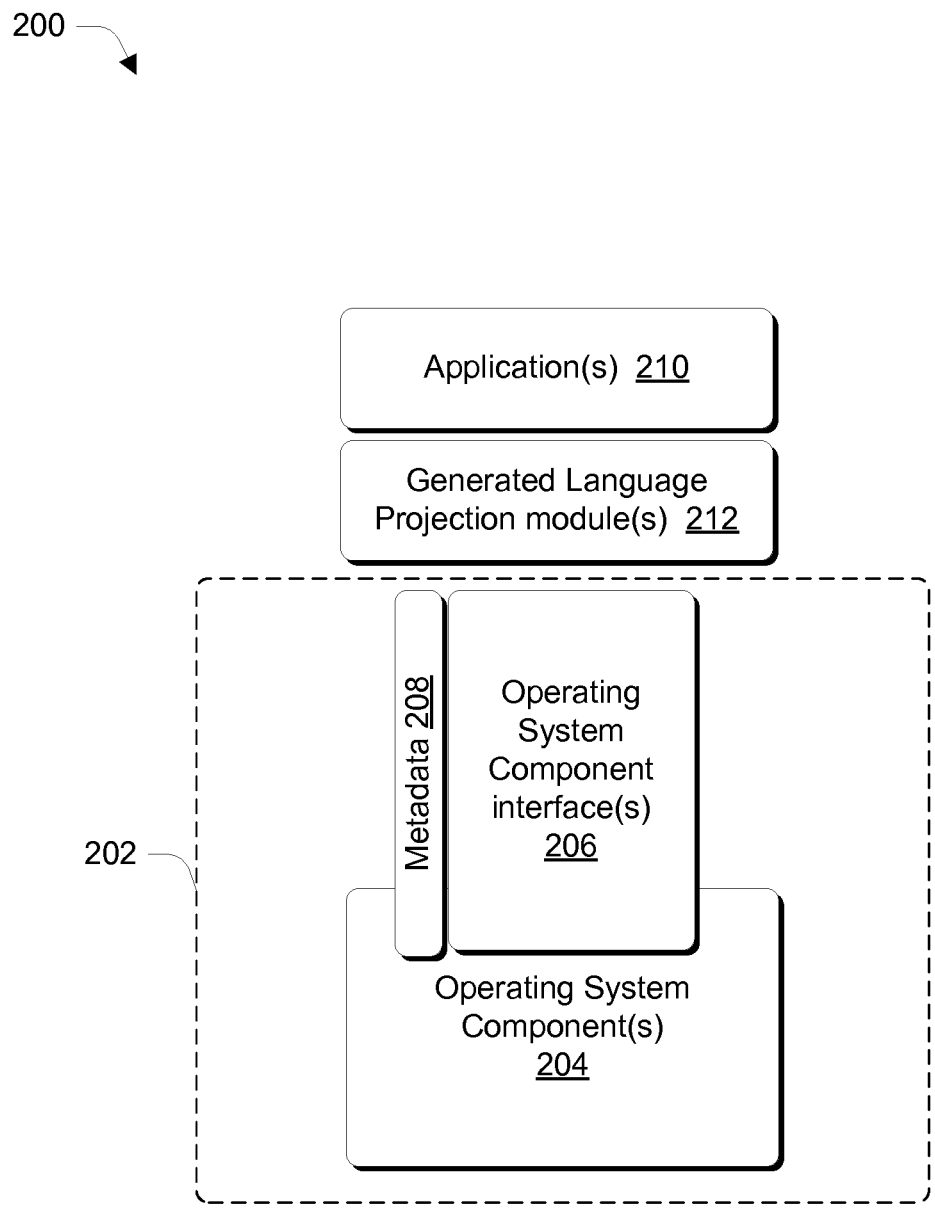
FIG. 2 illustrates an architecture in accordance with one or more embodiments.

Consider FIG. 2, which illustrates an example architecture 200, in accordance with one or more embodiments. Architecture 200 includes operating system 202, which can be configured to execute on a computing device. It should be understood that for the sake of brevity, operating system 202 is not illustrated in its entirety. Operating system 202 includes one or more operating system component(s) 204 configured to manage resources associated with a computing device. In some embodiments, operating system component(s) 204 can provide programmatic access to the resources, as well as one or more service(s) and/or feature(s) associated with managing the resources. Operating system component(s) 204 can also include basic elements associated with operating system 202, as well as complex elements built from the basic elements. While this example illustrates an architecture exposing functionality provided by operating system 202, it is to be appreciated and understood that the architecture can be applied to expose functionality provided by other suitable types of applications without departing from the spirit of the claimed subject matter.

In some embodiments, operating system component(s) 204 can be exposed via one or more interface(s), illustrated here as operating system interface(s) 206. This can be any suitable form of an interface, such as an Application Programming Interface (API). An application can access functionality provided by operating system component (s) 204 by calling and/or executing operating system interface(s) 206, as further described below. In some cases, the application utilizes a type system different than a type system used to describe operating system interface(s) 206. In some cases, operating system interface(s) 206 can include an application binary interface(s) (ABI). An ABI describes, at a machine-level, a binary contract for calling functions, methods, APIs, and the like. The binary contract can include an identification or name associated with a function, a signature that can be used to call the function, an order of parameters passed to the function and/or data types associated with parameters, etc. Alternately or additionally, the binary contract can include definitions and/or rules for exposing behavior associated with at least one type of a type system.

Operating system 202 also includes various metadata 208. Metadata 208 can include type resolution information that describes various aspects of associated operating system interface(s) 206, such as version information, what methods are available, what parameters the interface(s) take, data types of the parameters, the order in which to pass the parameters, data type behavior and/or resolution information, etc. In some embodiments, the metadata can include hierarchical information associated with an interface, such as information describing relationships between interface(s) and/or describing the interface(s) in an object-oriented manner. Metadata can also include class descriptions, associated methods and parameters of a class, and the like. In some cases, the metadata can describe the interface using an abstract type system (e.g. a type system that is independent of a specific programming language). Alternately or additionally, the metadata can include descriptions of a particular type system, such as the abstract type system. In turn, the specific programming language(s) can map descriptions of a particular type system (e.g. the abstract type system) to the specific programming language(s). Further, a programmer wanting to determine which interfaces are available can manually and/or programmatically access descriptions of each interface. For example, to determine what interfaces exist for operating system component(s) 204, what type system the interfaces are described in, and how to call them, the programmer can access associated metadata 208.

Architecture 200 also includes one or more application(s) 210.

Applications 210 can include one or more application(s) generated from one or more programming language(s), such as HTML, JavaScript, Visual Basic, C#, C++, and the like. In some embodiments, applications 210 include one or more call(s) into an operating system component. In some cases, application(s) 10 can be configured to first programmatically determine what interface(s) are available, and then make a call into one or more of the determined interface(s). In some cases application(s) 210 accesses the interface(s) with help from one or more generated language projection module(s) 212 as further described below.

In one or more embodiments, generated language projection module(s) 212 maps an abstract type definition to a specific programming language. Any suitable programming language can be mapped, examples of which are provided above. In some embodiments, a generated language projection module can be unique for each programming language. In other embodiments, a generated language projection module can be multi-purpose and utilized by multiple programming languages. A mapping enables current and future interfaces that are described using the abstract type system to be accessible to a specific programming language without additional programming statements (e.g. a wrapper function). The mapping further allows a specific programming language to call an interface in a manner that is native to the specific programming language. Any suitable type of information can be mapped, such as classes, data types, function pointers, structures, and the like.

Descriptions of the interface(s) can be used to describe how an application should call an interface, as well as describe behavior of a type system associated with the interface. Responsive to the descriptions being located, the application can dynamically determine how to call an interface and resolve type system differences between the application and interface. In some embodiments, an application using a different type system can programmatically access and resolve a type utilized by the interface without knowledge of a location of where the type description resides. Alternately or additionally, how descriptions are grouped can enable automatic type resolution, as further described below.

Consider a programmer writing an application using JavaScript. While this example describes an implementation using JavaScript, it is to be appreciated and understood that any programming language can be used without departing from the spirit of the claimed subject matter. To access external functionality, the programmer can include a statement in source code configured to identify a namespace and/or type associated with the functionality. For instance, an external type can be included and/or described in the source code as follows:

OperatingSystem.Foo.Bar.Type1

In this particular example, Type1 represents the functionality being accessed. This can be any suitable type of functionality, examples of which are provided above and below. The above syntax represents a multi-level namespace hierarchy traversable to locate Type1. At the highest level, Type1 resides in a namespace identified as "OperatingSystem". Within "OperatingSystem" resides a namespace identified as "Foo". Similarly, within "Foo" resides a namespace identified as "Bar", where Type1 resides. Accordingly, syntax can be used to identify a logical location of Type1. However, a physical location of Type1 (e.g. what file Type1 information resides in and/or what directory the file resides in) can sometimes change. In the past, the physical location could be determined by hard coding a path and filename within the application (directly or indirectly). Thus, if the filename and/or path of Type1 information changed, any direct or indirect references to the file name and/or path utilized by the application would be incorrect until updated. Further, until the direct or indirect references were updated, the application could potentially not function properly.

Various embodiments provide an ability to abstract type resolution. For example, a type can be programmatically resolved by an application without exact knowledge of a location of associated type resolution information. In some embodiments, the type resolution information can be relocated without updating applications utilizing the resolution information with new location information. The applications can be configured to locate the type resolution information regardless of which file the type resolution information resides in.

Figure 3:
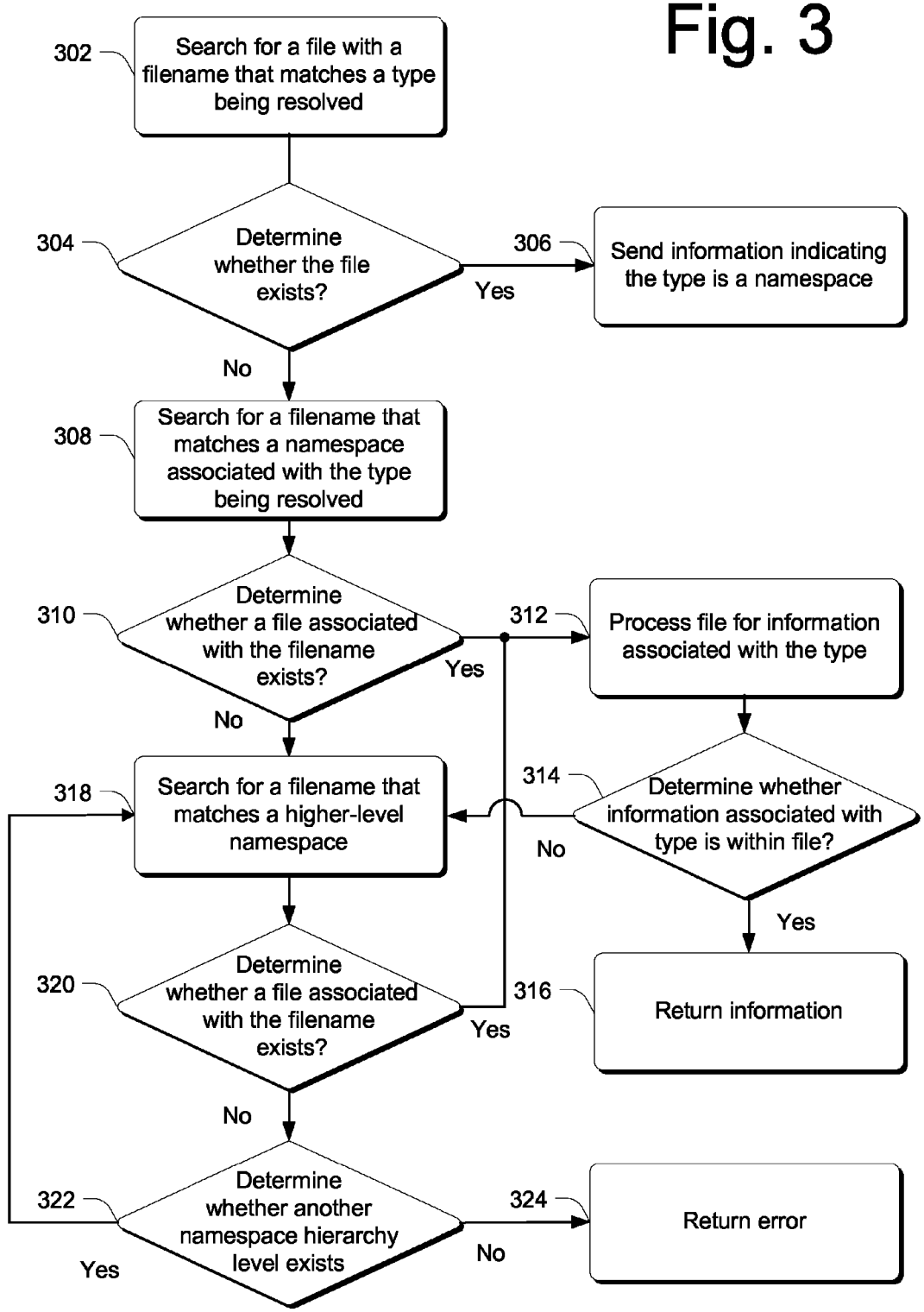
FIG. 3 illustrates a flow diagram in accordance with one or more embodiments.

Consider FIG. 3, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software module(s) executing on one or more computing device(s), such as type resolution module(s) 118 of FIG. 1b. In some embodiments, the method can be performed without user intervention.

Step 302 searches for a file with a filename that matches a type being resolved. This can include searching a plurality of metadata files as described above. Referring to the above syntax illustration, responsive to an application accessing OperatingSystem.Foo.Bar.Type1, step 302 searches for a file with the name "OperatingSystem.Foo.Bar.Type1". Any suitable type of search can be performed. For example, the search can be configured to look for an exact match between the type and filename, a partial match between the type and filename, and the like. Alternately or additionally, the search can be configured to search in one directory, multiple directories and/or subdirectories, or any combination thereof.

Step 304 determines whether the file exists. Responsive to determining the file exists, step 306 sends information indicating the type is a namespace. Responsive to determining the file does not exist, step 308 searches for a filename that matches a namespace associated with the type being resolved. In some cases, this can include manipulating a string that contains the namespace hierarchy to determine what namespace to search on. In the above example, Type1 is illustrated as being located three levels down in a namespace hierarchy. The string can be manipulated to remove the type (e.g. Type1) and leave the namespace hierarchy. Here, step 308 would search for a name associated with the namespace hierarchy "OperatingSystem.Foo.Bar". Similar to above, this search can be configured to search for an exact-match, a partial-match, search in one directory, subdirectories, etc.

Step 310 determines whether a file associated with the filename exists. Responsive to determining the file exists, step 312 processes the file for the information associated with the type.

Step 314 determines whether information associated with the type is located within the file. Responsive to determining the information associated with the type is within the file, step 316 returns the information. For example, the information can be returned to a calling program. However, responsive to determining the information associated with the type is not within the file, the process proceeds to step 318.

Step 318 searches for a filename that matches a higher-level namespace. This can be in response to determining a file does not exist, such as in response to step 310, or in response to not locating information associated with a type within a file, such as in response to step 314. A higher-level namespace can be determined in any suitable fashion. For instance, in the above example, the string can be further manipulated to reflect one level up in the namespace hierarchy (e.g. "OperatingSystem.Foo"). Step 318 determines the higher-level namespace and searches for a file with an associated name.

Step 320 determines whether a file associated with the filename exists. As in the case of step 310, if the file is determined to exist, the process proceeds to steps 312, 314, and/or 316, where the file is processed for associated type information.

Responsive to determining the file does not exist, step 322 determines whether another namespace hierarchy level exists. This can be determined in any suitable manner. For example, the string can be searched for a level separator. In the above example, syntax of a "." distinguishes between levels of namespace hierarchy.

Responsive to determining another namespace hierarchy level exists, the process repeats, and the process returns to step 318 to search for a file with the newly determined namespace. Steps 318, 320, and 322 repeat themselves until an appropriate file is found or the top of the namespace hierarchy has been reached and searched. Responsive to determining another namespace hierarchy level does not exist, step 324 returns an error. This can include throwing an exception, displaying a popup dialog box, etc.

Through the use of the method described above, multiple files and/or locations can be searched for type resolution information. As illustrated, a type search can be based, at least in part, on hierarchical namespace information. FIG. 3 describes a type search that starts at a lower namespace hierarchy level (e.g "OperatingSystem.Foo.Bar.Type1") and traverses up each namespace level until the type is located or the top namespace hierarchy level is reached (e.g. "OperatingSystem"). However, this search can execute in any suitable order. In some embodiments, a type search can start at a higher namespace hierarchy level (e.g. "OperatingSystem") and traverse down each namespace level until the type is located or the bottom namespace hierarchy level is reached (e.g "OperatingSystem.Foo.Bar.Type1"). Searching on a namespace hierarchy can abstract where type resolution information can reside, and further enable type resolution information to change locations without impact to applications accessing the type resolution information.

Having considered type resolution architecture configured to enable type resolution independent of location file name and/or location, consider now a discussion of flexible type description storage in accordance with one or more embodiments.

Type Description Storage

As metadata files can be used to describe various aspects of software interfaces. As described above, metadata files can include information describing interfaces in terms of a class hierarchy, an abstract type system, associated methods, properties, and events, and the like. In some cases, associated information can reside in multiple files. For example, different metadata files can include information pertaining to a same namespace. While multiple metadata files can give flexibility to developers of the metadata files, it can sometimes hinder users of the metadata files when searching. Consider an example where each namespace has its own associated metadata file. From a partitioning standpoint, separate files for each namespace can isolate changes to a namespace to an associated file. From a searching standpoint, however, having to search through multiple files for information can slowdown performance when searching at runtime. Further, from a knowledge standpoint, keeping track of what information is in what file can be compounded as the number of files increases.

Various embodiments enable type resolution without prior knowledge of a file name and file location of where type resolution information resides. Content of a set of input files can be analyzed and partitioned based, at least in part, on composition rules. A set of output files can be produced and are configured to include the partitioned content. The output files can enable locating the content without prior knowledge of where the content resides.

Figure 4:
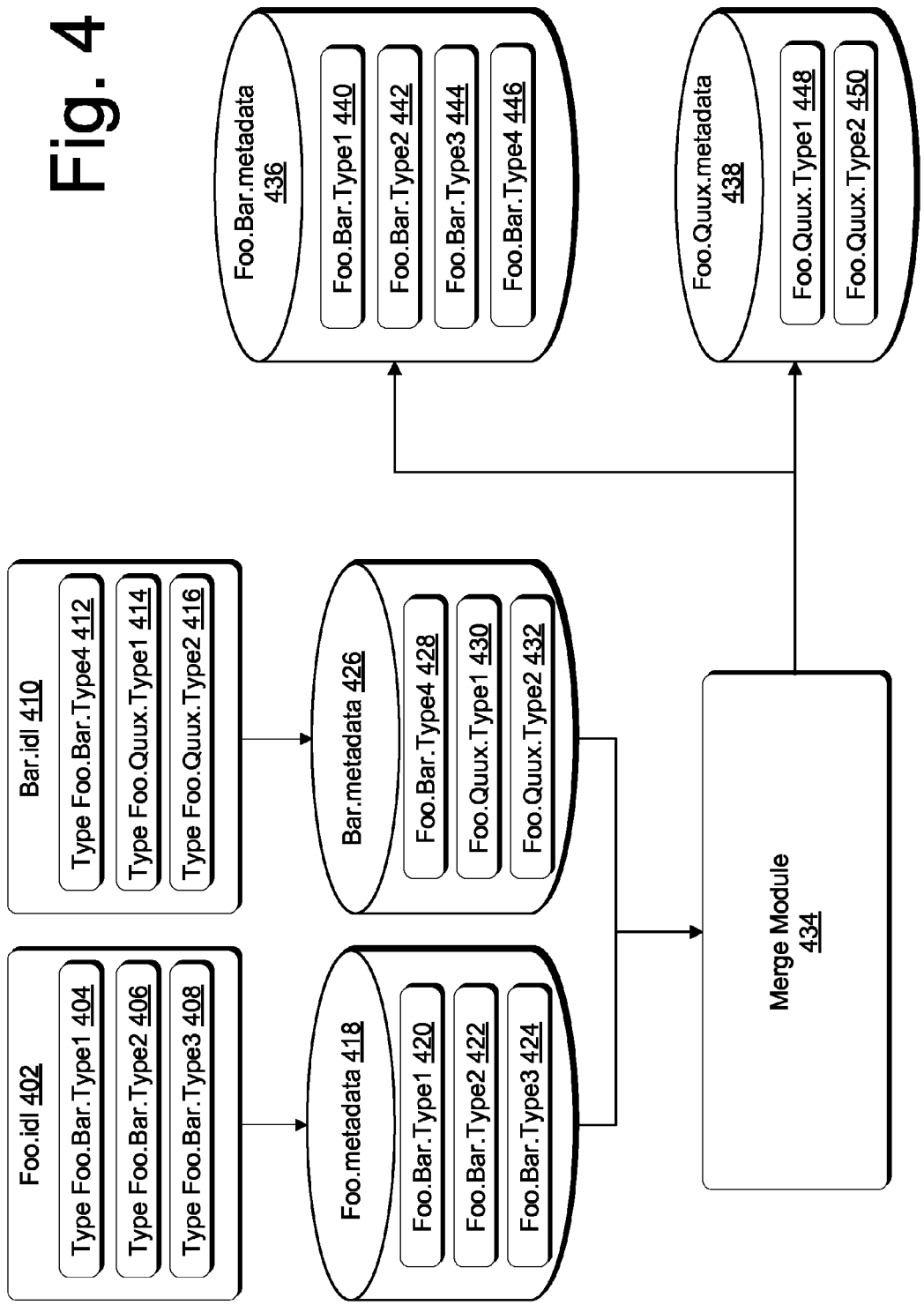
FIG. 4 illustrates a relationship diagram in accordance with one or more embodiments.

As an example, consider FIG. 4, which illustrates a relationship between descriptive language files, metadata files, and a merge module in accordance with one or more embodiments. In at least some embodiments, modules illustrated in the relationship diagram can be implemented as software, hardware, or any combination thereof, such as merge module(s) 116 of FIG. 1a.

In the illustrated and described embodiment, Foo.idl 402 represents a descriptive language file configured to describe one or more interface(s). In some embodiments, an interface can be associated with an operating system and/or an application, such as operating system interface(s) 108 and/or application(s) 110 of FIG. 1. The description language files can describe the interfaces using any suitable description, markup language, and/or syntax, such as with an Interface Definition Language (IDL), eXtensible Markup Language (XML), and the like. In this particular example, Foo.idl is representative of an IDL file.

Foo.idl 402 includes descriptions of three types: Type Foo.Bar.Type1 404, Type Foo.Bar.Type2 406, and Type Foo.Bar.Type3 408. While illustrated with three entries, it is to be appreciated and understood that any suitable number of descriptions, as well as types of descriptions, can be included in Foo.idl 402 without departing from the spirit of the claimed subject matter. For instance, types can include descriptions of classes, interfaces, methods, properties, events, and the like. In this example, types 404, 406, and 406 are described as being included in the hierarchical namespace of "Foo.Bar".

FIG. 4 also illustrates a second description language file, Bar.idl 410. Similar to Foo.idl 402, Bar.idl 410 represents a description language file that includes three types: Type Foo.Bar.Type4 412, Type Foo.Quux.Type1 414, and Type Foo.Quux.Type2 416. Referring to the syntax of types 412, 414, and 416, Bar.idl 410 includes at least one type in the namespace "Foo.Bar", and at least two types in the namespace "Foo.Quux".

Foo.metadata 418 represents a machine-readable metadata file based, at least in part, on Foo.idl 402. While not illustrated, in some embodiments, Foo.metadata 418 can be generated by a compiler from Foo.idl 402. Similar to Foo.idl 402, Foo.metadata 418 includes descriptions of types Foo.Bar.Type1 420, Foo.Bar.Type2 422, and Foo.Bar.Type3 424 in a format native to a metadata file. Bar.metadata 426 also represents a machine-readable metadata file which is based, at least in part, on Bar.idl 410. As in the case of Foo.metadata 418, Bar.metadata 426 includes type descriptions Foo.Bar.Type4 428, Foo.Quux.Type1 430, and Foo.Quux.Type3 432.

Included in FIG. 4 is merge module 434. Merge module 434 can accept one or more input file(s) and, in turn, generate one or more output file(s) based upon a set of criteria and/or rules. For example, input commands and/or rules can be applied to merge module 434 that specify an input directory in which to search for input files, an output directory in which to place output files, a level of validation to apply, what level of namespace hierarchy to consolidate and/or partition at, how to name output files, what number of output files to generate, what depth metadata files should be generated at, and the like. Criteria and/or rules can be given to merge module 434 in any suitable manner, such as through a command line and/or a "makefile" that contains one or more rule(s).

In this example, Foo.metadata 418 and Bar.metadata 426 are inputs to merge module 434. Merge module 434 parses through the input files and generates output file(s) as directed. Here, merge module 434 generates two output files: Foo.Bar.metadata 436 and Foo.Quux.metadata 438. Foo.Bar.metadata 436 includes types pertaining to the "Foo.Bar" namespace (e.g. Foo.Bar.Type1 440, Foo.Bar.Type2 442, Foo.Bar.Type3 444, and Foo.Bar.Type4 446). Similarly, Foo.Quux.metadata 438 includes types pertaining to the "Foo.Quux" namespace (e.g. Foo.Quux.Type1 448, Foo.Quux.Type2 450). As in the case above, Foo.Bar.metadata 436 and Foo.Quux.metadata 438 represent machine-readable metadata files that potentially contain reorganized and/or regrouped data from associated input files. Thus, merge module 434 can analyze content from multiple files and restructure the content according to a set of criteria.

In some embodiments, a file naming convention can be utilized to enable abstract type resolution. For example, a namespace hierarchy can be used as the naming convention. In FIG. 4, files Foo.Bar.metadata 436 and Foo.Quux.metadata 438 include an associated namespace hierarchy in their file name (e.g. "Foo.Bar" and "Foo.Quux", respectively). By utilizing this naming convention, type information can be searched for based upon its associated namespace, rather than a specific file name. Alternately or additionally, an output file can include multiple levels of namespace hierarchy data. In FIG. 4, Foo.Bar.metadata 436 is illustrated as containing data in the "Foo.Bar" namespace. However, Foo.Bar.metadata 436 can also be configured to include type information residing at a namespace hierarchy level of "Foo.Bar.Level1.Level2.Level3". Thus, the naming convention indicates a highest level namespace that can be contained within the file.

Additionally, a search algorithm, such as that described in FIG. 3, can be employed to traverse the different levels of the hierarchical namespace (and associated files) until an appropriate type is located. By configuring all type information at the same namespace hierarchy level to reside in the same file, the information associated with a particular level can be moved from file to file without impact to applications utilizing the information. Information associated with namespace hierarchies can be partitioned in any suitable way. For example, multiple hierarchy levels can reside in a same file (e.g. Foo.Bar, Foo.Bar.Level1, and Foo.Bar.Level2 all reside in a file named "Foo.Bar.metadata"), or each file can have its own associated file (e.g. information at the Foo.Bar level resides in "Foo.Bar.metadata", information at the Foo.Bar.Level1 resides in a "Foo.Bar.Level1.metadata" file, etc. Provided the information is placed according to its associated namespace hierarchy, type resolution can be abstracted by removing dependencies on a specific file name.

Figure 5:
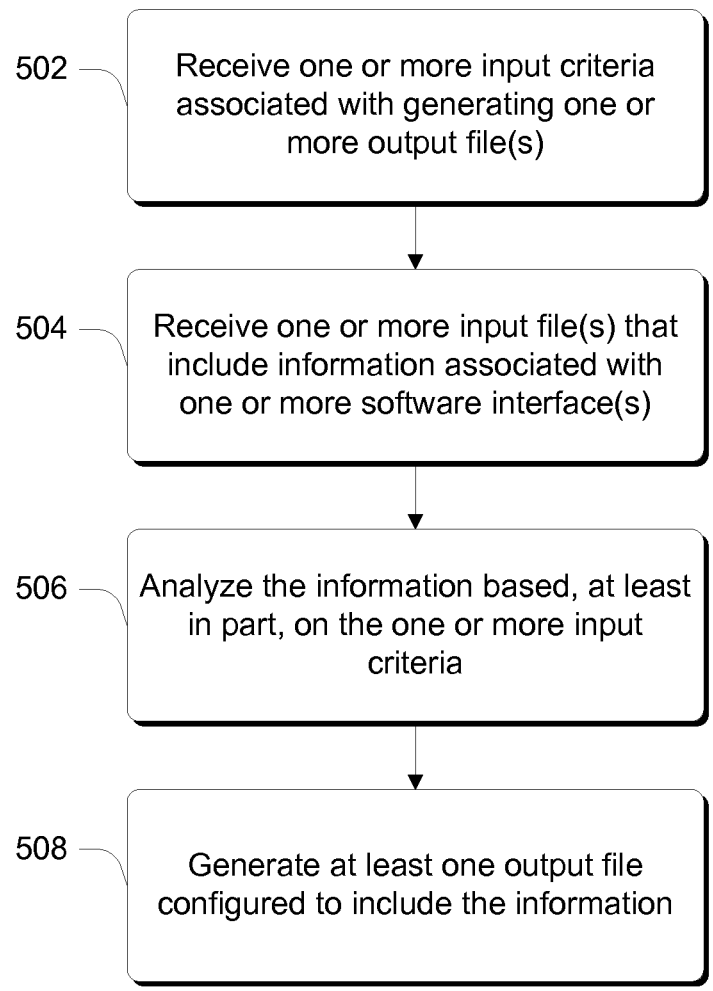
FIG. 5 illustrates a flow diagram in accordance with one or more embodiments.

Consider now FIG. 5, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software module(s) executing on one or more computing device(s), such as merge module(s) 116 of FIG. 1a.

Step 502 receives one or more input criteria associated with generating one or more output file(s). In some embodiments, the input criteria can include rule(s) that specify how to partition information into one or more output files. For example, the input criteria can specify one or more namespace hierarchy levels to group together in an output file. Alternately or additionally, the input criteria can describe where to find the information, such as by specifying what files and/or directories to pull information from.

Responsive to receiving the one or more input criteria, step 504 receives one or more input file(s) that include information associated with one or more software interfaces. The information can be any suitable type of information, such as descriptions of the software interfaces using an abstract type system, object-oriented associations, methods, properties, function pointers, input and/or output parameters, type system information, and the like. In some embodiments, type information can include namespace hierarchy information.

Responsive to receiving the one or more input file(s), step 506 analyzes the information based, at least in part, on the one or more input criteria. This can include analyzing the input files(s) to determine what namespace hierarchy type information exists within each file.

Responsive to analyzing the information, step 508 generates at least one output file that includes the information. In some embodiments, the output files can include information that has been repartitioned into different files based, at least in part, on the input criteria. The output file can be configured in any suitable manner, examples of which are provided above. For example, the output file(s) can be configured as a metadata file named with a naming convention based upon a namespace hierarchy included in the metadata file. Alternately or additionally, the output file(s) can be configured to include multiple levels of a namespace hierarchy. By grouping namespace hierarchy information together into an output file, applications can search for information based upon a namespace hierarchy level, rather than a specific filename. This enables flexible partitioning of the information without impact to the applications. As long as an application knows what namespace hierarchy level a particular type resides in, associated type information can be located in the output files, regardless of how the namespace hierarchy levels are grouped.

Having considered flexible type description storage, consider now a discussion of an example system in accordance with one or more embodiments.

Example System

Figure 6:
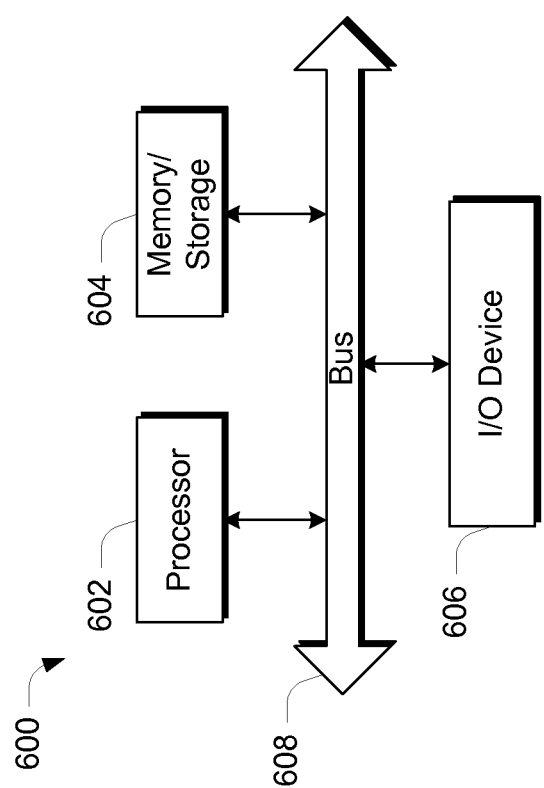
FIG. 6 illustrates an example system that can be utilized to implement one or more embodiments.

FIG. 6 illustrates an example computing device 600 that can be used to implement the various embodiments described above. Computing device 600 can be, for example, computing devices 102a and/or 102b of FIGS. 1a and 1b or any other suitable computing device.

Computing device 600 includes one or more processor(s) or processing unit(s) 602, one or more memory and/or storage component(s) 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer hardware storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output device(s) 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable hardware media implemented in any method or technology for storage of information such as computer readable instructions, data structures, program modules, or other data. Computer-readable hardware storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an ability to abstract type resolution between multiple type systems. At least one type can be described in one or more programmatically accessible file(s). In some embodiments, an application using a different type system can programmatically access and resolve a type of the at least one type system without knowledge of a location of where a description of the type resides. Alternately or additionally, type descriptions contained in the one or more programmatically accessible file(s) can be analyzed and restructured into one or more new programmatically accessible file(s) based, at least in part, upon the type descriptions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
searching a plurality of files for a first file associated with a type being resolved;
responsive to determining the first file exists, sending information indicating the type is a namespace;
responsive to determining the first file does not exist, searching the plurality of files for a filename matching a first namespace level hierarchy associated with the type;
responsive to determining a filename matching a first namespace level hierarchy associated with the type exists, processing a file associated with the filename for information associated with the type;
responsive to determining the filename matching the first namespace level hierarchy associated with the type does not exist, determining whether another namespace hierarchy level associated with the type exists; and
responsive to determining another namespace hierarchy level exists, searching the plurality of files for a filename associated with the another namespace hierarchy level.

2. The computer-implemented method of claim 1, the searching a plurality of files for a first file further comprising searching the plurality of files for a file with a filename matching a name associated with the type.

3. The computer-implemented method of claim 2, the searching a plurality of files for a first file further comprising searching for the first file without knowledge of a location of where the type resides.

4. The computer-implemented method of claim 1, the searching a plurality of files for a first file further comprising searching the plurality of files over multiple directories.

5. The computer-implemented method of claim 1 performed without user intervention.

6. The computer-implemented method of claim 1, the plurality of files comprising metadata files individual ones of which contain descriptions associated with an operating system software interface.

7. The computer-implemented method of claim 6, the metadata files configured to describe the type independent of a specific programming language.

8. The computer-implemented method of claim 1, the determining whether another namespace hierarchy level associated with the type exists further comprising performing said determining by manipulating a string that includes the namespace hierarchy levels.

9. One or more computer-readable hardware storage media comprising computer readable instructions which, when executed, implement:
a type resolution module configured to, without user intervention:

search one or more metadata files for a file with a filename that matches a namespace of a type associated with a type system;

responsive to determining the file exists, process the file for information associated with the type;

responsive to determining the file does not exist, perform, at least one time:
  determine whether another namespace hierarchy level associated with the type exists; and
  responsive to determining another namespace hierarchy level exists, search the one or more metadata files for a file with a filename that matches the another namespace hierarchy level;
  said perform, at least one time, terminating responsive to:
    determining the file with a filename that matches the another namespace hierarchy level exists; or
    determining another namespace hierarchy level does not exist.

10. The one or more computer-readable hardware storage media of claim 9, the search the one or more metadata files for a file with a filename that matches the another namespace hierarchy level comprising a search for at least a partial filename match to the namespace hierarchy level.

11. The one or more computer-readable hardware storage media of claim 9, the determining another namespace hierarchy level exists comprising manipulating a string containing the namespace hierarchy.

12. The one or more computer-readable hardware storage media of claim 9, the type associated with a type system comprising an Application Programming Interface (API) associated with an operating system.

13. The one or more computer-readable hardware storage media of claim 9, the search one or more metadata files for a file with a filename that matches a namespace of a type associated with a type system further comprising a search without knowledge of a location of where the type resides.

14. The one or more computer-readable hardware storage media of claim 13, the location of where the type resides comprising a file and directory associated with the file.

15. One or more computer-readable hardware storage media comprising computer readable instructions which, when executed, implement a method comprising:
  searching a plurality of files for a first file associated with a type being resolved;
  responsive to determining the first file exists, sending information indicating the type is a namespace;
  responsive to determining the first file does not exist, searching the plurality of files for a filename matching a first namespace level hierarchy associated with the type;
  responsive to determining a filename matching a first namespace level hierarchy associated with the type exists, processing a file associated with the filename for information associated with the type;
  responsive to determining the filename matching the first namespace level hierarchy associated with the type does not exist, determining whether another namespace hierarchy level associated with the type exists; and
  responsive to determining another namespace hierarchy level exists, searching the plurality of files for a filename associated with the another namespace hierarchy level.

16. The one or more computer-readable hardware storage media of claim 15, the searching a plurality of files for a first file further comprising searching the plurality of files for a file with a filename matching a name associated with the type.

17. The one or more computer-readable hardware storage media of claim 16, the searching a plurality of files for a first file further comprising searching for the first file without knowledge of a location of where the type resides.

18. The one or more computer-readable hardware storage media of claim 15, the searching a plurality of files for a first file further comprising searching the plurality of files over multiple directories.

19. The one or more computer-readable hardware storage media of claim 15, wherein the method is performed without user intervention.

20. The one or more computer-readable hardware storage media of claim 15, the plurality of files comprising metadata files individual ones of which contain descriptions associated with an operating system software interface.

* * * * *

UNITED STATES PATENT AND TRADEMARK OFFICE
CERTIFICATE OF CORRECTION

| | | |
|---|---|---|
| PATENT NO. | : 8,433,697 B2 | Page 1 of 1 |
| APPLICATION NO. | : 13/229697 | |
| DATED | : April 30, 2013 | |
| INVENTOR(S) | : Osterman et al. | |

It is certified that error appears in the above-identified patent and that said Letters Patent is hereby corrected as shown below:

In the Specification,

In column 4, line 5, delete "language" and insert -- language. --, therefor.

In column 9, line 39, delete "parses" and insert -- passes --, therefor.

Signed and Sealed this
Tenth Day of February, 2015

Michelle K. Lee
*Deputy Director of the United States Patent and Trademark Office*